United States Patent [19]

Canfield et al.

[11] Patent Number: 5,031,044
[45] Date of Patent: Jul. 9, 1991

[54] INSET PICTURE CENTERING IN A PIX-IN-PIX SYSTEM

[75] Inventors: Barth A. Canfield; David J. Duffield, both of Indianapolis, Ind.

[73] Assignee: RCA Licensing Corporation, Princeton, N.J.

[21] Appl. No.: 341,123

[22] Filed: Apr. 20, 1989

[51] Int. Cl.$^5$ ............................................. H04N 5/45
[52] U.S. Cl. ................................... 358/183; 358/160; 358/180
[58] Field of Search .................. 358/183, 22, 160, 180

[56] References Cited

U.S. PATENT DOCUMENTS

| 4,722,007 | 1/1988 | Fling | 358/180 |
| 4,744,581 | 9/1988 | Shiratsuchi | 358/180 |
| 4,811,103 | 3/1989 | Casey | 358/22 X |

OTHER PUBLICATIONS

Manual for TOSHIBA Model No. 30 ID1, Mar. 16, 1988.

CTC 140 Color TV Chassis Technical Training Manual pp. 21, 64, 68 and 70.
Demonstration of Goldstar Television Receiver Model No. CMT-2612P at Summer CES Show Seen Jun. 5, 1989.

Primary Examiner—James J. Groody
Assistant Examiner—Mark R. Powell
Attorney, Agent, or Firm—Joseph S. Tripoli; Peter M. Emanuel; Thomas F. Lenihan

[57] ABSTRACT

A PIP system stores data indicative of the location of the center point of an inset picture with respect to a display screen center point in a memory area of a first size. The inset image data is read out of the memory area beginning with the data stored in a memory location known as the "read address". When a ZOOM-IN or ZOOM-OUT command is received, data representing a new video image of a different size is stored for display in an unused memory area of a different size, a new inset center point is computed, and a new read address is computed, so that the displayed centers of the new inset area of a different size, and the old inset area are substantially the same.

9 Claims, 4 Drawing Sheets

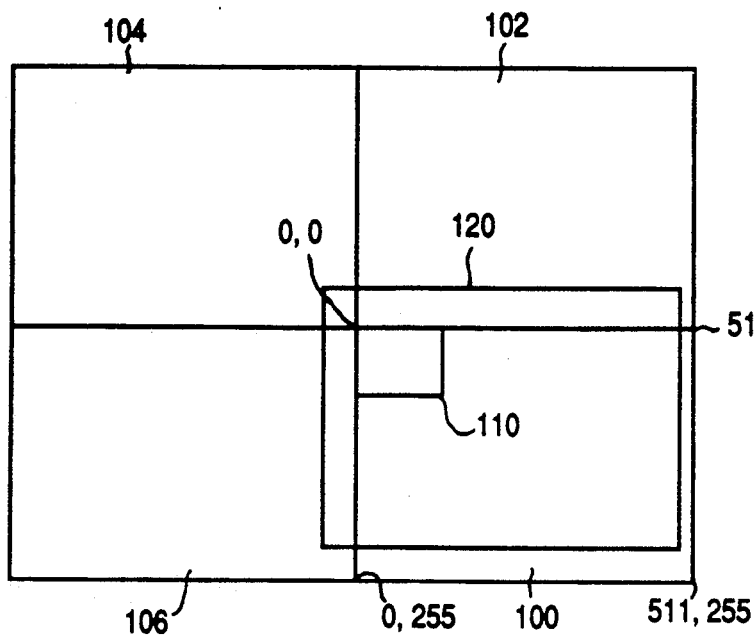
*FIG. 1*
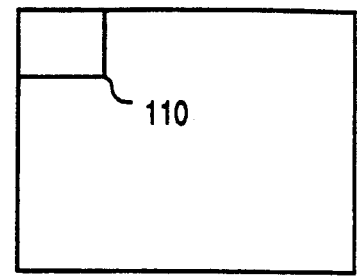
*FIG. 1a*
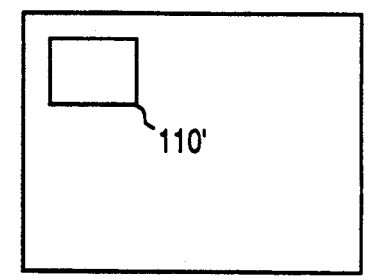
*FIG. 1b*
*FIG. 2*
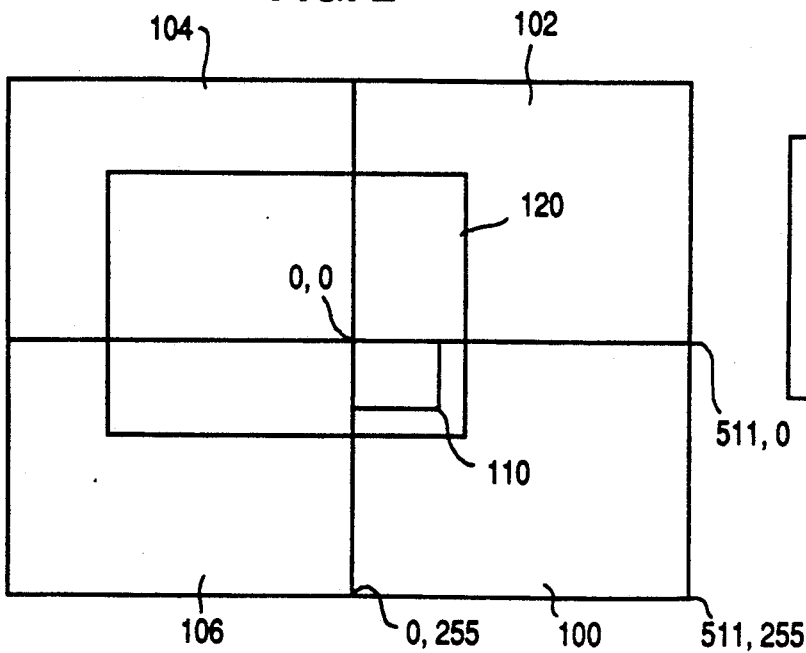
*FIG. 2a*

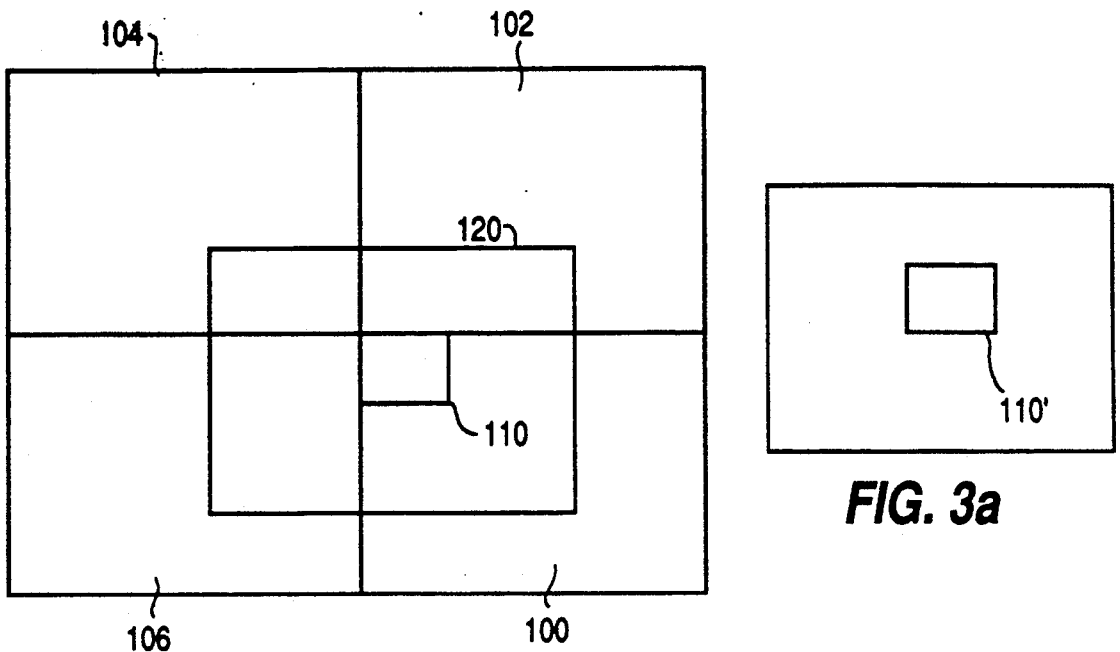
FIG. 3
FIG. 3a
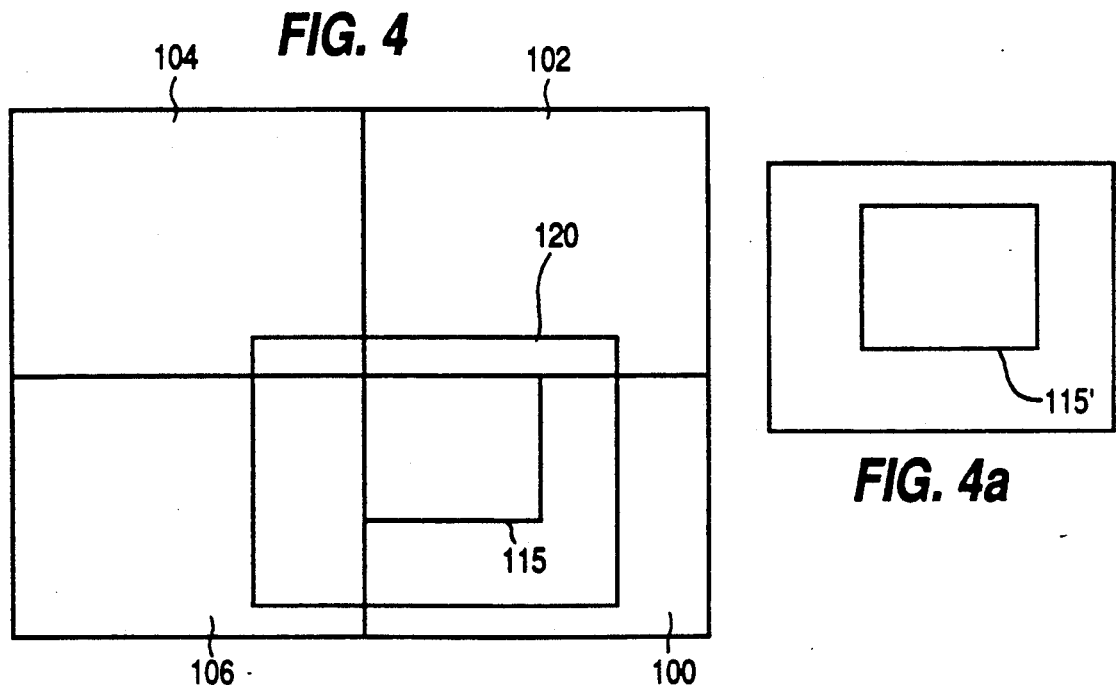
FIG. 4
FIG. 4a

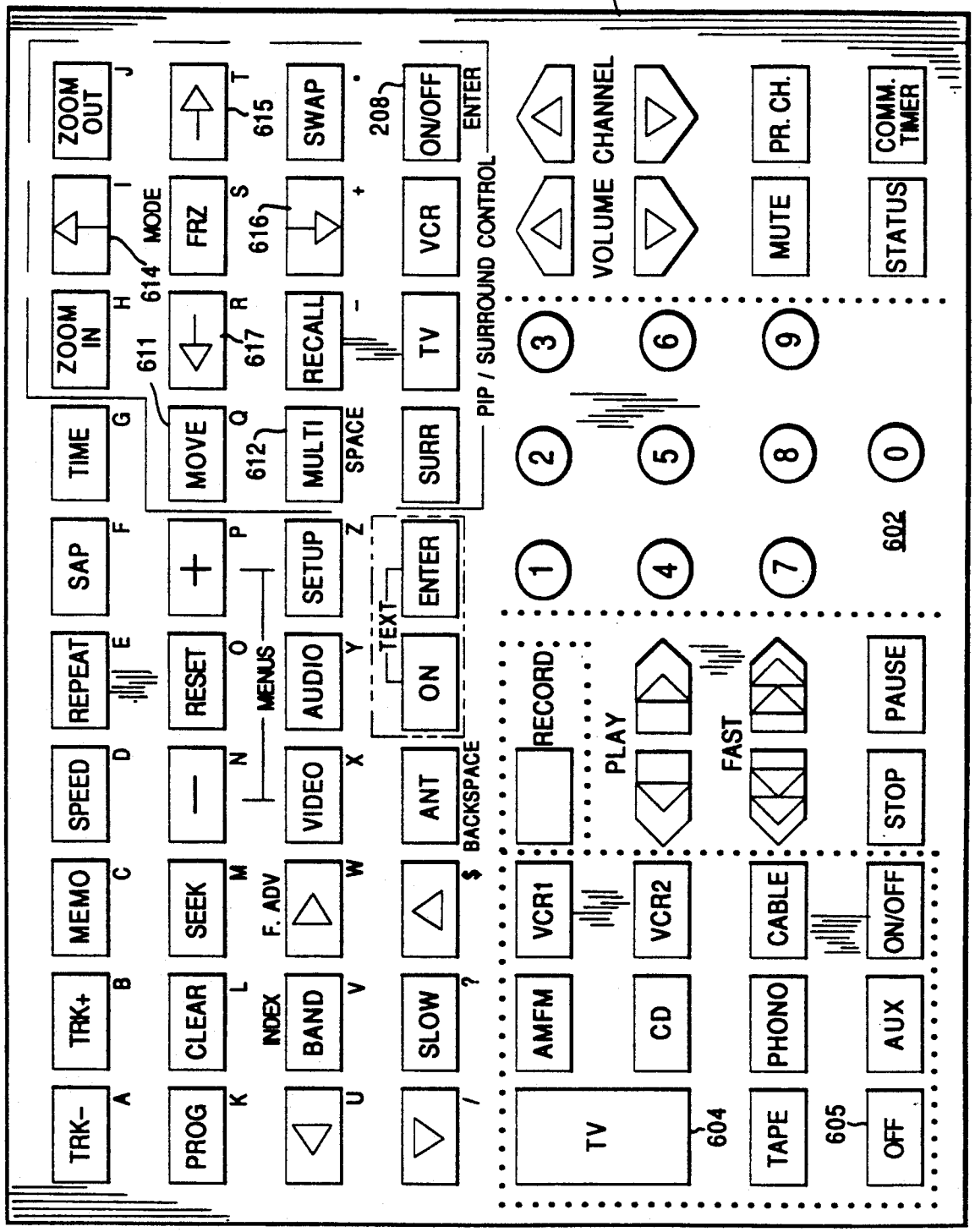

INSET PICTURE CENTERING IN A PIX-IN-PIX SYSTEM

FIELD OF THE INVENTION

This invention relates to the field of television receivers having picture-in-picture capability.

BACKGROUND OF THE INVENTION

The term "television receiver" as used herein includes television receivers having a display device (commonly known as television sets), and television receivers without a display device, such as videocassette recorders (VCR's).

The term "television receiver" as used herein also includes television monitor/receivers having an RF tuner and baseband signal input circuitry.

Many modern television receivers have picture-in-picture (PIP, or PIX-IN-PIX) capability, that is, the capability to receive video signals from two different sources and combine them to produce a signal which when displayed includes a first program in a main viewing area, and a second program in a secondary (inset) viewing area of the same display screen.

A PIP or PIX-IN-PIX unit is an IC developed to produce digital features in a television receiver. While the PIP is useful in producing a variety of special effects, perhaps the most common or obvious use of the PIP is to produce a single moving picture in picture feature in a television receiver.

SUMMARY OF THE INVENTION

A PIP system stores the location of the center point of an inset picture with respect to a display screen center point. When a ZOOM-IN or ZOOM-OUT command is received, the new video is stored for display in an unused area of a different size, the new inset center is computed, and a new read address is computed, so that the displayed centers of the new inset area of a different size, and the old inset area are substantially the same.

BRIEF DESCRIPTION OF THE DRAWING

FIGS. 1, 2, 3 and 4 illustrate physical and virtual areas of the memory unit of FIG. 5.

FIGS. 1a, 1b, 2a, 3a, and 4a illustrate display screens produced in accordance with the subject invention.

FIG. 6 illustrates a remote control handunit suitable for use with the invention.

DESCRIPTION OF THE INVENTION

Figure 5:
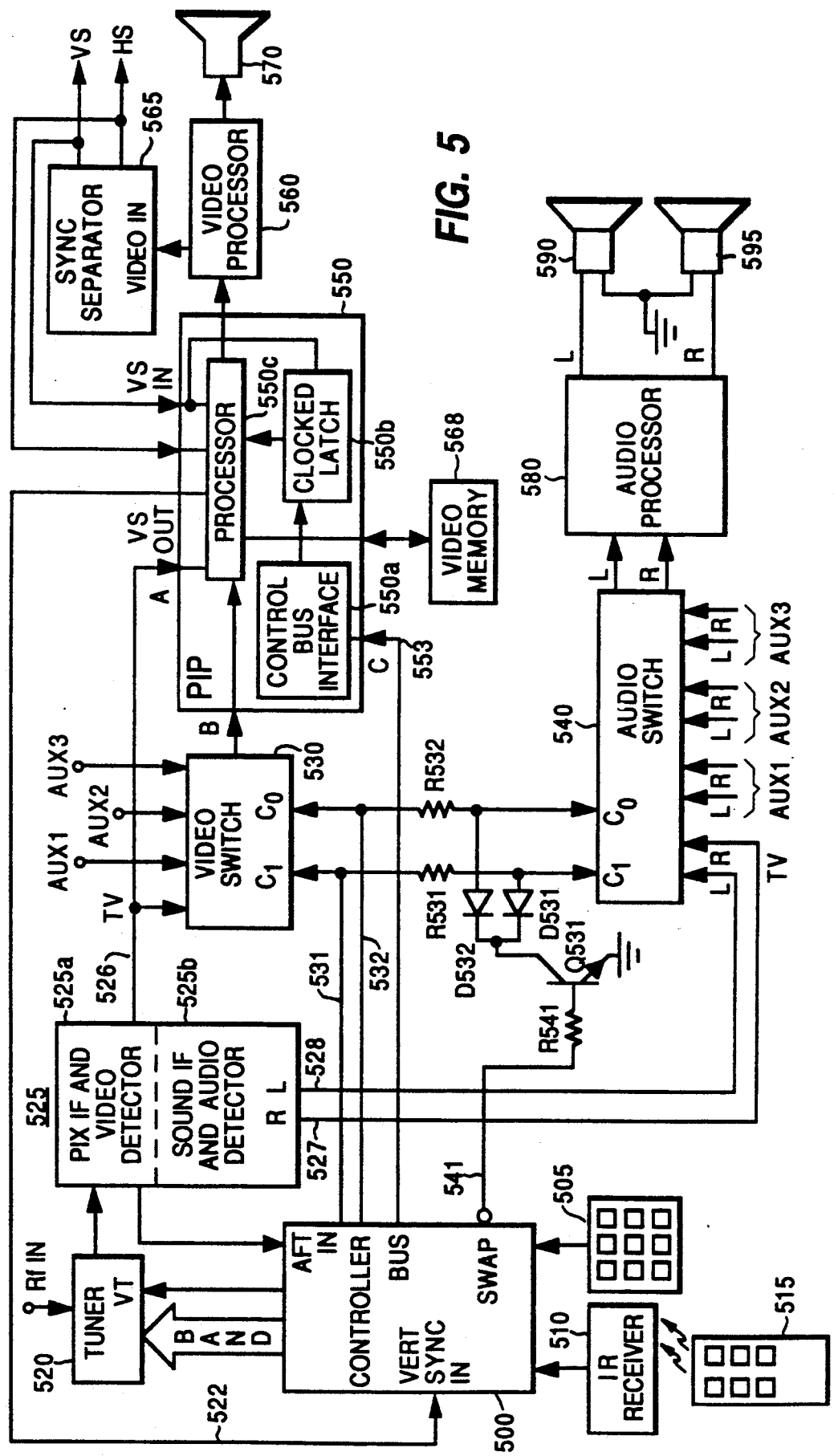

The PIP system of the subject invention is described in detail in copending U.S. application number 340,832 (Duffield and McNeally) entitled "Television System With Zoom Capability For At Least One Inset Picture" filed on 20 April 1989 and assigned to the same assignee as the subject invention. Briefly, this PIP system is based on a large digital memory which can be thought of as 512 pixels by 256 lines. This memory is circular (i.e. line 1 follows line 256 just as line 2 follows line 1. Pixel 1 follows pixel 512 just as pixel 2 follows pixel 1). When in the pip mode the PIP input circuitry writes small (or inset) picture fields into the memory at a position within the memory programmed into the PIP unit by the control microprocessor. This position is specified as an upper left hand corner position. The size of written small picture fields (both compression ratio and percent cropping) is also programmed into the PIP unit by the control micro. When in the pip mode, the PIP output circuitry begins reading the memory from a position programmed by the control micro. This read position is the position from which the PIP unit begins reading when the main picture is at the start (or upper left corner) of a new field. If the position of the inset picture on the main picture is to be changed, the PIP output circuitry is programmed to begin reading the memory from a different position. If the size of the inset picture is to be changed, the PIP input circuitry is programmed to begin writing smaller or larger inset picture fields into the memory.

When the PIP feature is turned on, the PIP input circuitry initializes the memory under direction of the control micro. This memory initialization is done to set up pip borders and fast switching control. The PIP input circuitry is then programmed by the control micro to begin writing compressed, cropped inset picture fields into the memory. The PIP output circuitry is programmed by the control micro to begin reading the memory from a given position. Both the position to which inset fields are written and the position from which the output circuitry begins reading determine the position of the inset picture on the main picture. If the user directs the control micro to move the inset picture to a new position on the main picture the control micro changes the position from which the PIP output circuitry begins reading the memory. A change in inset picture position can be caused by either changing the position the inset fields are written to or the position from which the output circuits begin reading. However if the input circuitry is to change the position to which inset fields are written the memory would first have to be reinitialized, which could not be done without a brief noticeable disturbance in the viewed small picture. A very smooth movement of the inset picture upon the main picture can be performed by changing the PIP read position (read address).

Movement of the PIX-IN-PIX inset about the display screen will now be explained with reference to FIGS. 1, 1a, 1b, 2 and 2a. Video memory (VRAM) used by the PIP unit under control of a microcomputer comprises approximately 1 Mbit of memory. It is organized in an array of 256 lines with each line comprising 512 pixels (picture elements). This memory is addressed circularly i.e. the addresses "wrap around" in both horizontal and vertical directions.

Referring to FIG. 1, the physical memory VRAM is illustrated by a block 100 having an upper left corner at a point 0, 0. Memory locations are numbered left to right in increasing order from 0 to 511. Lines of the array are numbered top to bottom in increasing order from 0 to 255. Thus, the top left memory location in physical memory 100 is 0,0 and the bottom right memory location is 255,511. Because these memory locations are addressed circularly, the line addressed after line 255 is line 0, and the pixel addressed after pixel 511 in any given line is pixel 0.

This circular addressing scheme permits the extension of fictional "virtual memories" 102, 104, and 106, as shown in FIG. I. The virtual memory concept, in turn, permits easier visualization of how a PIX-IN-PIX insert is moved about a display screen.

A PIX-IN-PIX insert 110 is shown stored in physical memory block ;00. Insert 110 has an upper left corner at memory location 0,0. If data were to be clocked out of VRAM 100 beginning at location 0,0 and ending at location 511,255 then the PIX-IN-PIX inset would be displayed as shown in FIG. 1a. However, the inset can be displayed in different areas of the display screen by beginning the clocking out (reading) of data at locations other than 0,0. By way of example, a "wire frame" 120 is superimposed so that is overlays both physical and vertical memory as shown in FIG. 1. The upper left corner of wire frame 120 is located approximately at memory location 478, 244 of virtual memory 104. Of course, this point doesn't actually exist because virtual memory 104 is fictitious. However, that point does exist in physical memory 100, and if a memory read begins at that point, the display of FIG. 1b results. Note that the PIX-IN-PIX inset 110' appears to have moved slightly down and to the right with respect to its position in FIG. 1a. Note also that the position of the inset in FIG. 1b corresponds exactly to the position of the inset with respect to fictitious wire frame 120.

As a further example, consider FIG. 2, wherein inset 110 is stored in the same locations as in the previous example, but wire frame 120 has been moved to a new position. The upper left corner of wire frame 120 is located approximately at memory location 163,93. If data is read from VRAM 100 beginning at location 163,93 in physical memory, then the display of FIG. 2a will result. Note that the inset 110' of FIG. 2a is grossly offset with respect to the position of the inset in FIGS. 1a and 1b.

It is important to note that the inset was apparently moved from one display position to another without having to move its actual stored location in VRAM 100. The change of position was accomplished entirely by changing the starting read address.

If the user directs the control micro to change the size of inset picture the control micro must first program the PIP to reinitialize the memory and to begin writing inset picture fields with the new compression ratio and percent of cropping. If the center of the inset picture is to lie on the same point within the main picture as the previous inset picture (before the size change was implemented) either the write position or read positions must be changed. The upper left hand corner of the inset picture would remain at the same point on the main picture if this were not done; the center of the inset picture would not remain at the same position.

As mentioned previously differing options are available in the PIP system for maintaining a consistent center of inset as the inset size is changed. The algorithm implemented in our system is as follows:

Compressed, cropped inset picture fields are always written to the same position within the memory, that is the upper left hand corner of the inset picture field is always at the same position within the memory regardless of the compression ratio or the percent cropped. Position of the inset picture upon the main picture is always controlled by varying the read position. The control micro maintains a variable which holds horizontal (HC) and vertical (VC) center positions of inset picture relative to the main picture. The control micro calculates the read addresses (both horizontal and vertical) from the HC and VC variables and from information about the current size of the inset picture. With this arrangement, if the control micro is directed by the user to move the inset picture, the control micro changes the HC and VC variables and recalculates new read addresses for use by the PIP unit. If the user directs the control micro to change the inset picture size, the control micro 1) directs the PIP unit to reinitialize the memory, 2) changes the parameters relating to the inset picture compression ratio and cropping, and 3) recalculates read address from current HC, VC, and the new inset picture size information. This process keeps the center of the new inset picture positioned over the same point on the big picture.

Zoom (i.e. enlargement) of a PIX-IN-PIX inset will be explained with reference to FIGS. 3, 3a, 4, and 4a. FIG. 3 shows the physical and virtual memory arrangement explained above with respect to FIGS. 1, 1a, 1b, 2, and 2a. An insert of a first size is shown stored in VRAM 100. As explained above, a fictitious wire frame 120 is positioned about the inset, and is used to determine the displayed position of the inset as shown in FIG. 3a. The upper left corner of wire frame 120 is located approximately at memory location 313,193, which, of course, is the location in physical memory from which data is begun to be read at the start of the display time.

In FIG. 4, a new larger sample of data 115 has been stored in VRAM 100. It is desirable that the displayed center of the new area 115' coincide with the displayed center of previously displayed inset 110'. This is accomplished by moving wire frame 120 to change the displayed position of inset 115'. Accordingly, the upper left corner of wire frame 120 of FIG. 4 is located approximately at memory location 383,193.

The equations used to locate the first read location (i.e. the upper left corner of frame 120) are:

$$HRP = 512 - [HC - SW] \quad (1)$$

and
$$VRP = 256 - [VC - SH] \quad (2)$$

where
SW = the inset picture width;
SH = the inset picture height;
HC = Horizontal center relative to the center of the main picture;
VC = Vertical center relative to the center of the main picture;
HRP = Horizontal read position; and
VRP = Vertical read position.

The system described above is capable of producing a large number (e.g. approximately 80) different sizes of inset pictures, by varying the rate at which the data is read-in, and the rate at which the data is read out of VRAM 100. As a practical matter, however, it has been found that four or five different inset sizes are sufficient.

Referring to FIG. 5, a controller 500 receives user-entered control signals from a local keyboard 505 and from an infrared (IR) receiver 510. IR receiver 510 receives and decodes remote control signals transmitted by a remote control unit 515. Controller 500, which may be a microprocessor or microcomputer, causes a television tuner 120 to select a particular RF signal to be tuned in response to data entered by a user. Tuner 520 produces a signal at an intermediate frequency (IF) and applies it to a processing unit 525 comprising a first section 525a including a picture (PIX) amplifying stage an AFT circuit, and video detector, and a second section 525b including, a sound amplifying stage, an audio detector and a stereo decoder. Processing unit 525 produces a baseband video signal (TV), and baseband left and right audio signals. The AFT circuit of processing unit 525 also produces a signal from which AFT crossover is detected and applies it via line 524 to controller 500.

The baseband video signal (TV) is coupled via line 526 to one input of a four input video switch 530. The baseband left and right audio signals are applied to one pair of inputs of an audio switch 540 capable of selecting a pair of inputs from four pairs of audio inputs. Video switch 530 and audio switch 540 each have three other inputs labelled AUX1, AUX2 and AUX3, for receiving respective baseband video and audio signals from external sources. Each of the inputs of video switch 530 and audio switch 540 is selectable in response to binary signals generated by controller 500 and applied to control inputs $C_1$ and $C_0$ via conductors 531 and 532, respectively. For example, if $C_1$ and $C_0$ are both caused to be at a low signal level (i.e. binary 00), then the TV input is selected. If $C_1$ is low and $C_0$ high (binary 01), then AUX1 is selected. If $C_1$ is high and $C_0$ low (binary 10), then AUX2 is selected. If both $C_1$ and $C_0$ are high (binary 11), then AUX3 is selected. The selection of corresponding video and audio signals is ensured because the control lines 531 and 532 are coupled to respective control inputs $C_1$ and $C_0$ of both video switch 530 and audio switch 540.

The selected video signal is applied to a video processor unit 560 and ultimately displayed on a display screen of a display device 570. Video signals are also applied to a sync separator unit 565 which derives vertical and horizontal synchronizing signals therefrom. The selected audio signals are applied to an audio processor unit 180 and ultimately reproduced via speakers 590, 595. The above-described circuitry is essentially known from the RCA CTC-140 television receiver manufactured by Thomson Consumer Electronics, Indianapolis, Indiana.

In accordance with the present invention, a picture-in-picture (PIP) unit 550 is shown inserted between video switch 530 and video processor 560. The A signal input of PIP unit 550 is connected to receive baseband signals from the built-in tuner/IF circuitry of the television receiver, and the B signal input is connected to receive the output signal of video switch 530. PIP unit 550 has a VS IN input for receiving vertical rate synchronizing signals and an HS IN input for receiving horizontal rate synchronizing signals from sync separator unit 565. Sync separator unit 565 also couples vertical synchronizing signals to a VERT SYNC IN terminal of controller 500 via a line 522. PIP unit 550 has a control input C to which a serial control bus 553 is coupled. Serial control bus 553 couples command data from controller 500 which controls PIP unit 550 to produce an image for display having a main (or primary) picture and an inset (or secondary) picture. Under controller command, via serial bus 553, the PIP function may be enabled and disabled, and the inset picture may be displayed, for example, in each of the four corners, or in several other areas. PIP unit 550 includes a control bus interface 550a, a latch 550b and a processing unit 550c. Latch 550b allows incoming processor commands to be synchronized at the vertical rate. Also under controller command via serial bus 553, PIP unit 550 may be controlled to interchange (swap) the main and inset television images. The sound reproduced by speakers 590, 595 desirably "follows" (i.e., is the sound associated with) the image displayed as the main picture.

The structure of FIG. 5 provides for selection of an audio signal in response to control signals applied to parallel-connected control inputs $C_1$ and $C_0$ of video signal switch 130 and audio signal switch 540, and also in response to a signal indicative of whether the main and inset pictures are swapped. This is accomplished by circuitry comprising resistors R531, R532, diodes D531, D532, transistor Q531, and a SWAP control line 541. The operation of the audio selection circuitry is not relevant to the subject invention, and therefore does not need to be described in detail.

IR receiver 510 receives IR signals transmitted by, for example, a remote control handunit such as the one shown in FIG. 6 and designated 600. Referring to FIG. 6, remote control handunit 600 includes keys 602 for entering the digits 0–9, for entering "channel-up" and "channel-down" commands and a key 604 for turning the receiver "on" and a key 605 for turning the receiver "off." Remote control handunit 600 also includes an array of keys 610 (labelled PIP/SURROUND CONTROL) including a key 608 (labelled ON/OFF), a key 611 (labelled MOVE), and arrow keys 614–617, for controlling inset movement on the display screen. Remote control handunit 600 includes therein electronic circuitry (not shown) for encoding a signal to be transmitted by an IR diode in accordance with the particular keys pressed.

What is claimed is:

1. A picture-in-picture system for a television receiver, comprising:

data entry means for generating data signals in response to activation by a user;

tuner demodulator means having an input for receiving a plurality of radio frequency signals, and having a control input for receiving a first control signal, said tuner demodulator means tuning one of said radio frequency signals in response to said first control signal and producing a detected video signal therefrom at a first output;

memory means for storing data representing a video image;

picture-in-picture processing means coupled to said first output of said tuner demodulator means for receiving said detected video signal, for storing in said memory means data representing a predetermined amount of aid video signal in response to a second control signal, and for producing a first display signal by reading said data from said memory means beginning at a first memory location, said first display signal when displayed on a display screen produces a display image having an image area of a first size displayed in one of a plurality of image locations, said image being related to said stored video signal, and said image area of said first size having a first center position;

control means for controlling said tuner demodulator means and for controlling said picture-in-picture processing means, said control means having a first input coupled to said data entry means for receiving said data signals, having a first output for developing said first control signal, and having a second output for developing said second control signal;

said control means in response to said data signals generates said second control signal causing said picture-in-picture processing means to store data representing a different predetermined amount of signal in said memory means representative of a second display image having an image area of a second size, said image area of said second size having a second center position;

said control means computing a second memory location from which to begin reading in response to said data representing said different amount of signal stored in said memory means and in response to said first center position, such that the displayed centers of said first and second displayed image area are substantially the same.

2. The picture-in-picture system of claim 1 wherein said control means is a microprocessor.

3. The picture-in-picture system of claim 2 wherein said data signal causing said control means to generate said second control signal is a ZOOM OUT control data signal, and said different predetermined amount of signal stored for said display image area of said second size is a greater amount than stored for said display image area of said first size.

4. The picture-in-picture system of claim 3 wherein said data signal causing said control means to generate said second control signal is a ZOOM IN control data signal, and said different predetermined amount of signal stored for said display image area of said second size is a lesser amount than stored for said display image area of said first size.

5. The picture-in-picture system of claim 4 wherein said second memory location from which to begin reading, is computed from the horizontal and vertical center positions of said display image area of said first size relative to the center of said display screen, and from said different amount of data stored for said display image area of said second size.

6. A picture-in-picture system for a television receiver, comprising:
data entry means for generating data signals in response to activation by a user;
input means for receiving a video signal;
memory means for storing data representing a video image;
picture-in-picture processing means coupled to said input means for receiving said video signal, for storing in said memory means data representing a predetermined amount of said video signal in response to a second control signal, and for producing a first display signal by reading said data from said memory means, said first display signal when displayed on a display screen produces a display image having an image area of a first size displayed in one of a plurality of image locations and having a first center position relative to the center of said display screen, said image being related to said stored video signal,
control means for controlling picture-in-picture processing means, said control means having a first input coupled to said data entry means for receiving said data signals, and having an output for developing said control signal;
said control means in response to said data signals generates said second control signal causing said picture-in-picture processing means to store in said memory means data representing a different predetermined amount of signal and representative of a second display image having an image area of a second size;
said control means computing the display position of said display image of said second signal in response to said data representing said different amount of signal stored in said memory means and in response to said first center position, such that the displayed centers of said first and second displayed image areas are substantially the same.

7. In a television system, apparatus comprising:
picture-in-picture processing means responsive to first and second video signals for generating a third video signal representing an image including a main image area corresponding to said first video signal and an inset image area corresponding to said second video signal within said main image area;
control means coupled to said picture-in-picture processing means for controlling the position of said inset image area within said main image area and for changing the size of said inset image area in response to a control signal;
said control means including means for calculating the location of said inset image area within said main image area as a function of the size of said image area so that the geometric center of said inset image area remains substantially constant in both horizontal and vertical directions as the size of said inset image area is changed.

8. The television system of claim 7 further including memory means, coupled to said picture-in-picture processing means for storing data corresponding to said second video signal for display in said inset image area.

9. The television system of claim 8 wherein said control means is a microprocessor.

* * * * *